C. E. FULTON.
PROCESS FOR MAKING CLAY POTS.
APPLICATION FILED JUNE 7, 1919.

1,364,875.

Patented Jan. 11, 1921.

INVENTOR
C. E. Fulton
by
James C. Bradley
Atty.

UNITED STATES PATENT OFFICE.

CLARENCE E. FULTON, OF TARENTUM, PENNSYLVANIA, ASSIGNOR TO PITTSBURGH PLATE GLASS COMPANY, A CORPORATION OF PENNSYLVANIA.

PROCESS FOR MAKING CLAY POTS.

1,364,875.  Specification of Letters Patent.  Patented Jan. 11, 1921.

Application filed June 7, 1919. Serial No. 302,473.

*To all whom it may concern:*

Be it known that I, CLARENCE E. FULTON, a citizen of the United States, and a resident of Tarentum, in the county of Allegheny and State of Pennsylvania, have made a new and useful Invention in Processes for Making Clay Pots, of which the following is a specification.

Figure 1:
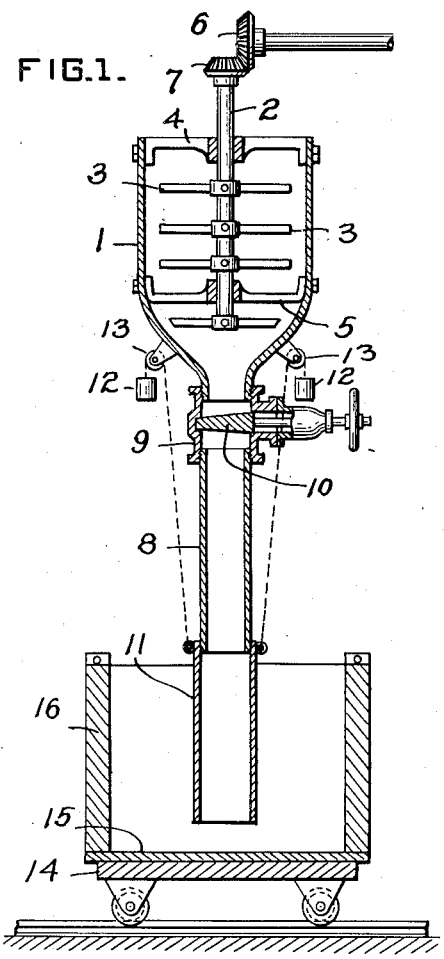
Figure 3:
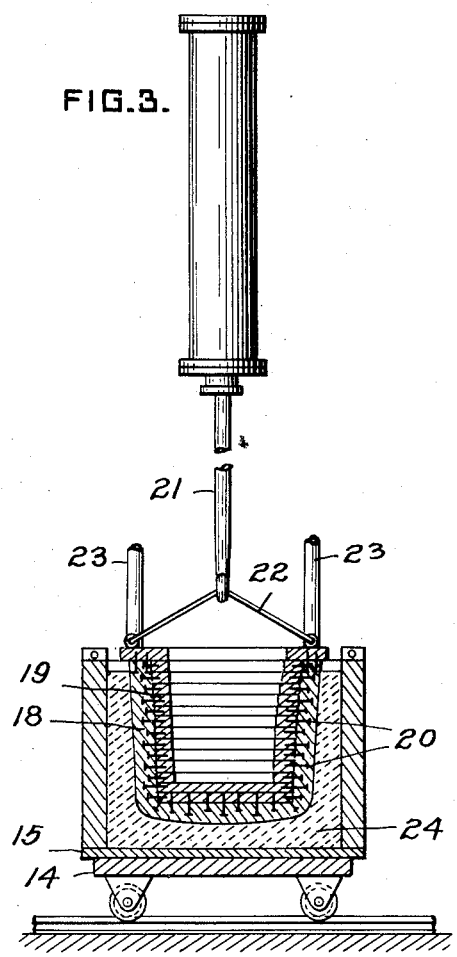
Figure 2:
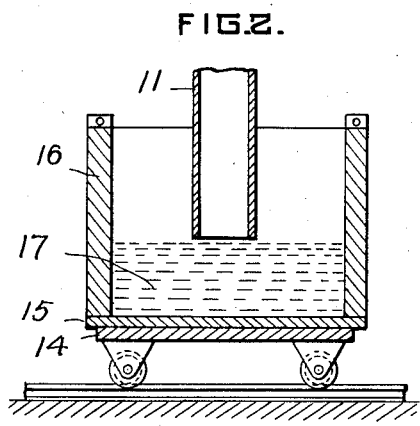
Figure 4:
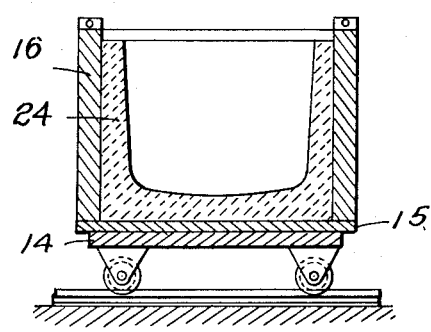

The invention relates to the making of clay pots and particularly such pots as are designed for use in the manufacture of glass such as optical and plate glass. It has for its principal objects the provision of a process (1) whereby the labor involved is reduced, (2) whereby the pot produced may be more quickly dried than has heretofore been the case with the ordinary hand made pots, and (3) whereby all air spaces or voids are eliminated and the clay batch compacted into a mass of uniform texture. Various forms of apparatus may be employed for carrying out the process. A very simple form is shown in the accompanying drawings, wherein:

Figure 1 is a vertical section through the apparatus for mixing and supplying the clay to the mold; Fig. 2 is a vertical section through the mold showing the position of the supply tube after the necessary amount of clay for forming a pot has been supplied to the mold; Fig. 3 is a vertical section through the apparatus after the application of the forming core; and Fig. 4 is a vertical section through the mold and pot formed therein after the withdrawal of the core.

Heretofore clay pots for use in the manufacture of glass have, in most cases, been made by a hand operation, in which the pots were constructed by skilled workmen, the walls being built up in a series of courses, and the operation of constructing the pot extending over a period of several days. The pots produced by this method, while comparatively satisfactory as to performance, were very expensive, due to the large amount of hand labor. The forming of pots by casting operation in molds has also been attempted heretofore, in order to do away with the hand labor, the procedure involving the positioning of a mold under a filling machine with a core in position therein, to which the clay in a semi-fluid state was conducted and allowed to set, the core and mold being finally removed to permit of the drying of the pot.

The casting operation, while much cheaper than the hand operation heretofore described, has been more or less unsatisfactory because of the quality of the pots produced. In many cases the pots have been of non-uniform texture, the material in said pots not being properly compacted, and air spaces and voids being of common occurrence and rendering the pots unreliable and liable to breakage. In carrying out the operation it has also been difficult to secure a proper flow of the clay to all parts of the form without the addition of such a large amount of water that difficulty in drying the pots was experienced and there was an undue amount of shrinkage. The size of the pots made in this way has also been limited, due to the fact that with so much water in the mixture only relatively thin walls (not over four inches in thickness) could be successfully dried.

It is the principal object of the present invention to improve upon the casting process so as to secure a proper compacting of the clay and a uniform condition throughout the article produced, thus avoiding air spaces and giving a pot as reliable as those constructed by the hand process. Further, this object is accomplished by the use of a minimum amount of water, so that the pots may be dried in a relatively short time and without cracking due to shrinkage, and so that the process is applicable even to large pots having relatively thick walls.

Briefly stated, this object is accomplished by supplying to the mold the quantity of clay necessary for the formation of a pot, and then utilizing the compressive force of the core to compact the material and eliminate voids and air spaces. In order that the clay may be sufficiently fluid without the application of a large amount of water, deflocculating agents are employed, such agents being supplied to the mixer before the application of the clay to the mold. The entrapping of air intermediate the mixer and the mold is avoided by the use of an upwardly movable supply conduit so arranged that the point of discharge occurs close to the bottom of the mold and may be gradually moved up as the filling operation progresses, so that only a relatively small amount of air is drawn into the mass of clay during the operation of transferring the clay from the mixer to the mold.

Fig. 1 shows the mixer in position to discharge to the mold. This mixer may be of any approved type and comprises a casing 1, in which is mounted a shaft 2 carrying the mixing plates 3, the shaft being supported for rotation by means of the spiders 4 and 5. The shaft may be turned by any desired means, such as the bevel gears 6 and 7. A discharge spout 8 is provided at the lower end of the casing connected to such casing by a coupling 9, and a slide valve 10 is employed for controlling the supply of material to the spout 8. Mounted to telescope over the spout 8 is a sleeve 11, such sleeve being counterweighted by means of the weights 12 connected to the sleeve by means of cords passing over the pulleys 13.

The mold is preferably carried upon a truck 14 and comprises a bottom board 15 and side walls 16, preferably made in two or more segments, so that the mold may be taken away from the pot after the clay has set, in order to permit of the further drying of the pot. The segments 16 are made of plaster-of-Paris in order to promote the absorption of moisture from the clay and hasten the setting operation, this being a well known expedient in the art.

The clay batch is first supplied to the mold and thoroughly mixed with the necessary amount of water. After or during a thorough mixing, deflocculating agents are added in order to give the necessary fluidity without the use of too much water. A variety of agents may be used, such as gallic acid, sodium silicate, sodium carbonate, caustic soda and others. A combination of these agents is preferably used, it being desirable to have the clay so that it will flow readily without the addition of a large amount of water.

At the beginning of the operation of supplying the mold, the sleeve 11 is in the position illustrated in Fig. 1, with its lower end adjacent the bottom of the mold, and as a result there is little opportunity for the flowing stream to entrap air as the clay moves from the mixer to the mold. As the filling operation progresses, the sleeve 11 is raised gradually so that when the filling operation is completed, the sleeve occupies the position indicated in Fig. 2, at which time the body of clay 17 is sufficient in volume to form the pot.

The truck 14, carrying the mass of clay, is then moved from beneath the mixer to a position beneath the press, which operates the core shown in Fig. 3. This core preferably consists of an outer layer 18 of plaster-of-Paris carried by a wood form 19, the parts being secured together by means of the nails or rods 20 extending from the wood portion 19 into the plaster portion 18. This core is preferably supported from a lifting device by means of the rod 21 engaging the bail 22. The press, not shown, is provided with a plurality of downwardly projecting rods or arms 23, adapted to engage the core and force the same down into the position of Fig. 3. Any suitable means desired may be employed for forcing the rods 23 downward, such as screw devices or suitable hydraulic or pneumatic power means, a very considerable amount of force being required since the mass of clay batch is only partially fluid and opposes a very decided resistance to the downward movement of the core. The resistance to the downward movement of the core, however, is very beneficial in its effect, since the pressure applied to the clay in order to make it flow upward and form the walls of the pot, gives a compacting action tending to fill up any air spaces or voids which would otherwise be present throughout the mass. As a result of this operation, the mass of clay batch is very thoroughly compacted and a relatively dense uniform texture is secured. The use of clay which is relatively stiff and contains little moisture is therefore of advantage in three particulars. In the first place, as above pointed out, the stiffness of the clay insures a proper compacting of the mass under the action of the core, in the second place, a rapid setting and drying of the pot is insured, and in the third place, this feature renders the process applicable to the manufacture of large pots having thick walls, which it would be impossible to satisfactorily dry if the mixture contained too large an amount of water.

After the clay has set sufficiently to maintain its form, the core is withdrawn, and the mold 16 is taken apart and removed, Fig. 4 showing the pot 24 in position upon the truck after the withdrawal of the core, but before the removal of the mold. After the removal of the core and mold, the pot is allowed to dry in the usual manner, such drying taking a somewhat shorter period than is the case with the ordinary hand made pots. Subsequent treatment of the pots is the same as in the case of pots made in the ordinary way.

What I claim is:

A process of making clay pots which consists in depositing sufficient clay batch to form a pot in a semi-fluid condition in a pot mold, said batch being carried in a conduit to a point of discharge adjacent the bottom of the mold and such point of discharge being raised as the filling operation progresses, then forcing a core down into the mass, causing a portion thereof to rise in the mold and form the sides of the pot, allowing the batch to set with the core in position therein, and finally removing the core and mold.

In testimony whereof, I have hereunto subscribed my name this 6th day of June, 1919.

CLARENCE E. FULTON.